United States Patent
Taieb

(10) Patent No.: US 7,031,002 B1
(45) Date of Patent: *Apr. 18, 2006

(54) SYSTEM AND METHOD FOR USING CHARACTER SET MATCHING TO ENHANCE PRINT QUALITY

(75) Inventor: David D. Taieb, Boston, MA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,541

(22) Filed: Aug. 27, 1999

Related U.S. Application Data

(60) Provisional application No. 60/114,574, filed on Dec. 31, 1998.

(51) Int. Cl.
*G06F 15/00* (2006.01)

(52) U.S. Cl. .................... 358/1.11; 715/542; 382/185; 382/229

(58) Field of Classification Search ............... 358/1.11; 707/542; 345/471; 283/229–231, 185–189; 715/542

See application file for complete search history.

(56) References Cited

U.S. PATENT DOCUMENTS

| | | | |
|---|---|---|---|
| 4,289,411 A | 9/1981 | Cornelius et al. | 400/126 |
| 4,428,694 A | 1/1984 | Ragen | 400/144.2 |
| 4,456,969 A | 6/1984 | Herzik et al. | 364/900 |
| 4,777,617 A | 10/1988 | Frisch et al. | 364/900 |
| 4,873,634 A | 10/1989 | Frisch et al. | 364/419 |
| 4,907,194 A | 3/1990 | Yamada et al. | 365/49 |
| 5,009,276 A | 4/1991 | Raikes et al. | 177/25.15 |
| 5,136,289 A | 8/1992 | Yoshida et al. | 341/67 |
| 5,165,014 A | 11/1992 | Vassar | 395/112 |
| 5,222,200 A | 6/1993 | Callister et al. | 395/112 |
| 5,377,280 A | 12/1994 | Nakayama | 382/17 |
| 5,377,349 A | 12/1994 | Motomura | 395/600 |
| 5,392,419 A | 2/1995 | Walton | 395/500 |

(Continued)

FOREIGN PATENT DOCUMENTS

EP 0 457 705 A2 11/1991

(Continued)

OTHER PUBLICATIONS

U.S. Appl. No. 09/384,088, Brendan P. Murray et al., filed Aug. 27, 1999.

(Continued)

*Primary Examiner*—Edward Coles
*Assistant Examiner*—Alan Rahimi
(74) *Attorney, Agent, or Firm*—Pillsbury Winthrop Shaw Pittman LLP

(57) ABSTRACT

A system and method of using character set matching to identify the matching or best-matching font to print text of indeterminate language are presented. Today's operating systems do not provide the native tools and functions to easily display text of unknown language or multiple languages. The complexity of any underlying code that handles a multilingual display is sharply increased due to the text being segmented into multiple text runs. The invention employs character set engine that provides necessary character set guessing functionality, as well as an enumerator module to build a linked list of suitable output fonts to display text from an arbitrary language, and multilingual text. Output on a laser, inkjet or other printing apparatus can be granted by traversing that list.

20 Claims, 10 Drawing Sheets

U.S. PATENT DOCUMENTS

| | | | |
|---|---|---|---|
| 5,418,718 A | 5/1995 | Lim et al. ................... | 364/419 |
| 5,438,650 A | 8/1995 | Motoyama et al. ......... | 395/114 |
| 5,495,577 A * | 2/1996 | Davis et al. ................ | 715/542 |
| 5,500,931 A * | 3/1996 | Sonnenschein ............. | 345/170 |
| 5,506,940 A * | 4/1996 | Bamford et al. ........... | 358/1.11 |
| 5,526,469 A | 6/1996 | Brindle et al. .............. | 395/109 |
| 5,548,507 A | 8/1996 | Martino et al. ........ | 364/419.01 |
| 5,586,288 A | 12/1996 | Dahlberg .................... | 395/435 |
| 5,659,770 A | 8/1997 | Yamada ...................... | 395/792 |
| 5,706,413 A | 1/1998 | Takabayashi et al. ....... | 395/110 |
| 5,713,033 A | 1/1998 | Sado .......................... | 395/796 |
| 5,717,840 A | 2/1998 | Pardo ......................... | 395/112 |
| 5,754,748 A | 5/1998 | Rivers et al. ............... | 395/116 |
| 5,771,034 A | 6/1998 | Gibson ....................... | 345/141 |
| 5,778,213 A | 7/1998 | Shakib et al. ............... | 395/500 |
| 5,778,361 A | 7/1998 | Nanjo et al. .................... | 707/5 |
| 5,778,400 A | 7/1998 | Tateno ........................ | 707/513 |
| 5,793,381 A | 8/1998 | Edberg et al. .............. | 345/467 |
| 5,802,539 A | 9/1998 | Daniels et al. .............. | 707/542 |
| 5,812,818 A | 9/1998 | Adler et al. ................ | 395/500 |
| 5,819,303 A | 10/1998 | Calhoun ..................... | 707/536 |
| 5,828,817 A | 10/1998 | Landau ....................... | 395/112 |
| 5,841,376 A | 11/1998 | Hayashi ...................... | 341/51 |
| 5,844,991 A | 12/1998 | Hochberg et al. ........... | 382/218 |
| 5,859,648 A | 1/1999 | Moore et al. ............... | 345/471 |
| 5,873,111 A | 2/1999 | Edberg ....................... | 707/536 |
| 5,946,648 A | 8/1999 | Halstead, Jr. et al. .......... | 704/9 |
| 6,023,528 A * | 2/2000 | Froessl ....................... | 382/181 |
| 6,031,622 A | 2/2000 | Ristow et al. ............. | 358/1.11 |
| 6,073,147 A * | 6/2000 | Chan et al. ................. | 345/467 |
| 6,098,071 A | 8/2000 | Aoyama et al. ............ | 707/102 |
| 6,138,086 A | 10/2000 | Rose et al. ..................... | 704/8 |
| 6,141,656 A | 10/2000 | Ozbutun et al. .............. | 707/3 |
| 6,144,934 A | 11/2000 | Stockwell et al. ............. | 704/1 |
| 6,157,905 A | 12/2000 | Powell .......................... | 704/2 |
| 6,167,369 A | 12/2000 | Schulze ......................... | 704/9 |
| 6,216,102 B1 | 4/2001 | Martino et al. ................ | 704/9 |
| 6,240,186 B1 | 5/2001 | Hyde et al. ................. | 380/255 |
| 6,252,671 B1 | 6/2001 | Peng et al. ................ | 358/1.11 |
| 6,321,192 B1 | 11/2001 | Houchin et al. ............... | 704/9 |
| 6,643,647 B1 | 11/2003 | Natori ........................... | 707/6 |
| 6,718,519 B1 | 4/2004 | Taieb ......................... | 715/542 |
| 6,785,677 B1 | 8/2004 | Fritchman ...................... | 707/6 |
| 6,813,747 B1 | 11/2004 | Taieb ......................... | 715/542 |
| 2001/0019329 A1* | 9/2001 | Kobayashi .................. | 345/467 |
| 2001/0020243 A1 | 9/2001 | Koppolu et al. ............ | 707/513 |
| 2002/0136458 A1 | 9/2002 | Nagasaka et al. ........... | 382/209 |
| 2004/0190526 A1 | 9/2004 | Kumar et al. .......... | 370/395.21 |

FOREIGN PATENT DOCUMENTS

| | | |
|---|---|---|
| EP | 0 886 228 A2 | 12/1998 |
| EP | 1 056 024 A1 | 11/2000 |
| WO | WO 92/15067 | 9/1992 |
| WO | WO 01/20500 A2 | 3/2001 |
| WO | WO 02/01400 A1 | 1/2002 |

OTHER PUBLICATIONS

U.S. Appl. No. 09/384,089, David D. Taieb, filed Aug. 27, 1999.

U.S. Appl. No. 09/384,371, Brendan P. Murray et al., filed Aug. 27, 1999.

U.S. Appl. No. 09/384,442, Brendan P. Murray et al., filed Aug. 27, 1999.

U.S. Appl. No. 09/384,443, Brendan P. Murray et al., filed Aug. 27, 1999.

U.S. Appl. No. 09/384,538, David D. Taieb, filed Aug. 27, 1999.

U.S. Appl. No. 09/384,542, David D. Taieb, filed Aug. 27, 1999.

Akira et al., "Viewing Multilingual Documents on your Local Web Browser", *Communications of the ACM*, vol. 41, No. 4, Apr. 1998, pp. 64-65.

Sakaguchi et al., "A Browsing Tool for Multi-Lingual Documents for Users without Multi-Lingual Fonts", University of Library and Information Science, copyright 1996, pp. 63-71.

Turnbull, "Alphabet Soup: The Internationalization of Linux, Part 1", *Linux Journal*, vol. 1999, Issue 59es, Mar. 1999.

Turnbull, "Alphabet Soup: The Internationalization of Linux, Part 2", *Linux Journal*, vol. 1999, Issue 60es, Apr. 1999.

Au, "Hello, World! A Guide for Transmitting Multilingual Electronic Mail", *Proceedings of the 23rd ACM SIGUCCS Conference on Winning the Networking Game*, St. Louis, MO, User Service Conference, 1995, pp. 35-39.

Baeza-Yates et al., "A New Approach to Text Searching", *Communications of the ACM*, vol. 35, Issue 10, Oct. 1992, pp. 74-82.

Aho et al., "Efficient String Matching: An Aid to Bibliographic Search", *Communications of the ACM*, vol. 18, Issue 6, Jun. 1975, pp. 333-340.

Ferragina et al., "Fast String Searching in Secondary Storage: Theoretical Developments and Experimental Results", *Symposium on Discrete Algorithms*, Proceedings of the Seventh Annual ACM-SIAM Symposium on Discrete Algorithms, 1996, pp. 373-382.

* cited by examiner

Unicode's encoding layout

SYSTEM AND METHOD FOR USING CHARACTER SET MATCHING TO ENHANCE PRINT QUALITY

CROSS-REFERENCE TO RELATED APPLICATIONS

This application claims priority from, and incorporates by reference, U.S. Provisional Patent Application Ser. No. 60/114,574, filed Dec. 31, 1998, entitled "System and Method for Evaluating Character Sets". The subject matter of this application is also related to co-pending U.S. patent application Ser. No. 09/384,088 filed Aug. 27, 1999, entitled "System and method for Evaluating Character Sets to Generate a Search Index"; U.S. patent application Ser. No. 09/384,089, filed Aug. 27, 1999, entitled "System and Method for Output of Multipart Documents"; U.S. patent application Ser. No. 09/384,371, filed Aug. 27, 1999, entitled "System and Method for Evaluating Character Sets to Determine a Best Match Encoding a Message"; U.S. patent application Ser. No. 09/384,442, filed Aug. 27, 1999, entitled "System and Method for Evaluating Character Sets of a Message Containing a Plurality of Character Sets"; U.S. patent application Ser. No. 09/384,443, filed Aug. 27, 1999, entitled "System and Method for Evaluating Character Sets"; U.S. patent application Ser. No. 09/384,538, filed Aug. 27, 1999, entitled "System and Method for Highlighting of Multifont Documents"; and U.S. patent application Ser. No. 09/384,542, filed Aug. 27, 1999, entitled "System and Method for Outputting Character Sets in Best Available Fonts".

FIELD OF THE INVENTION

The invention relates to the field of communications, and more particularly to the management of character set information within documents so that the most appropriate font may be used to output documents in printed form which have an arbitrary language origin.

BACKGROUND OF THE INVENTION

With the use of the Internet, email and related electronic services, communications software has been increasingly called upon to handle data in a variety of formats. While the barriers to simple communications have been removed from many hardware implementations, the problem of software being unable to display text in different languages remains.

For instance, a person browsing the World Wide Web may wish to input a search string in their native language. Some Web pages or search engines will simply accept that string in the form in which it was input, but not process the spelling, syntax or character set in native form. The search engine then performs a search as though the search were in English, usually resulting in no hits. Other Web pages may allow user to manually specify the desired language for browsing and searching.

To display multilingual data correctly on the output side when a document is located and ready to be outputted on a computer screen, sent to a printer or otherwise using the right font is a common problem that developers encounter when writing international applications, including Web applications.

In the pursuit of better and more uniform multilingual documents, the International Standards Organization (ISO) and other bodies have developed a universal character set standard referred to as Unicode, Version 2.0 of which was released in 1996. The current Unicode standard is a 16-bit protocol encoding 25 different scripts as well as at least 38,885 separate characters. Scripts are in general higher-level collections of related characters from a character set which may be assembled for use in one or more languages.

Ultimately, displaying Unicode data becomes a problem of dynamically selecting the closest font available on a system to best express a subject document. The commercial TrueType™ and OpenType™ font sets can only output the appropriate glyphs or symbols for a subset of Unicode ranges. It is therefore necessary to generate the right character set (charset) font flag information, that is, to identify the font best matching the data to be displayed when creating the graphical font object for display or printing.

Unfortunately, documents often originate from unknown sources and unknown languages and even if the original text is encoded in Unicode, it can be difficult to identify in which character set or Unicode target range the content has been encoded with. Once the character set is identified, it can be mapped to the corresponding font flag information used to create the logical font under a given operating system. For example, text that can be encoded as Code page 874 would be mapped to THAI_CHARSET in Microsoft™ Windows™.

The display of Unicode data consequently relates to a process of selecting a font and using whatever system application programming interface (API) is available to output the text, a process which becomes even more complicated when the text is in multiple languages. Because the selected font might not be able to render all the characters from all the different character sets used in multipart, multilanguage documents, that type of data must be broken into different textual segments that use the same character set and display them separately using the appropriate font.

Therefore, among other technical complexities, the software developer must solve at least two fundamental problems when trying to accommodate multilingual output. The first is to determine which character set or Unicode ranges the text has been encoded with. The second, to choose the font that will be able to render the characters most correctly. Other problems exist, including the selection of most appropriate fonts for developing printed output.

SUMMARY OF THE INVENTION

The invention overcoming these and other problems in the art relates to a system and method for character set matching to achieve best printed output, in which character set information is embedded in fonts and large-capacity fonts containing symbols applicable to a variety of languages include font tag information representing their capabilities. Application software, operating system software and other resources may therefore interrogate the font tag information to determine whether a given font may represent the characters of a message on a character-by-character basis. A linked list of matching fonts is built, which may be traversed to output the document to a screen display, printer or elsewhere. Textual documents having more than one language may be analyzed in successive runs, in which the most suitable font is selected for each segment for printing such as on a laser, inkjet or other printing apparatus.

BRIEF DESCRIPTION OF THE DRAWINGS

The invention will be described with respect to the accompanying drawings, in which like numbers represent like elements.

DETAILED DESCRIPTION OF THE ILLUSTRATIVE EMBODIMENTS

First, one illustrative environment in which the invention operates will be described, in which documents to be processed are assumed to be stored in the Unicode format. Unicode is a 16-bit universal character encoding that encompasses virtually all characters commonly used in the languages of today's world. Unicode encodes text by scripts, and not necessarily by individual languages.

The Unicode standard assigns the same code point to characters or ideographs that are shared among multiple languages, even though these characters may have different meanings and pronunciations in those different languages. For this reason, one character can be rendered by more than one glyph or symbol from different character sets, and this can potentially add logical errors to the displayed text.

Scripts can be defined as a higher-order collection of related characters which can be assembled to form one or more languages. For example, Cyrillic script can be used for the expression of Russian, Ukrainian, Bulgarian and other languages. Hebrew script can be used to express Modern Hebrew, Biblical Hebrew, and other languages. Each script has its own properties and rules, including logical order (right to left, left to right, neutral), dynamic composition, ligature and other attributes.

Ultimately, it is the responsibility of the font resources to implement the rules and behaviors proper to each script as outlined by the Unicode standard. For a font to be Unicode conformant, it must correctly interpret and render a subset of Unicode characters, providing support for one or many specific scripts and languages. To avoid ambiguity, the invention helps to transparently identify the language or character set being used in the data so that a best match to available output fonts may be made.

Otherwise, in the absence of the invention the operating system would have to select whatever default language is available in the given script. This can result in character rendering errors. Therefore, the invention operates to choose the optimal font for display as well as to select the correct script in the font, and may query the font properties and display the text output according to correct rules of language. Moreover, the invention may process texts composed in several different languages, one after the other for output.

Figure 10:
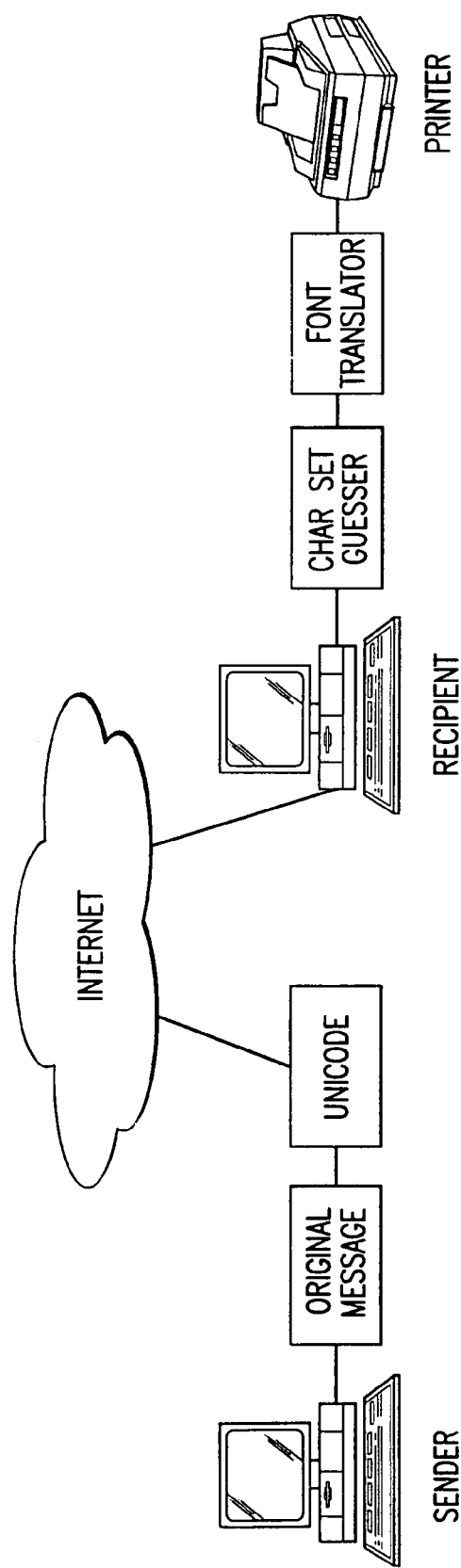
FIG. 10 illustrates the transmission of a message over a network according to the invention.

An illustration of the overall text processing according to the invention is shown in FIG. 10.

Figure 2:
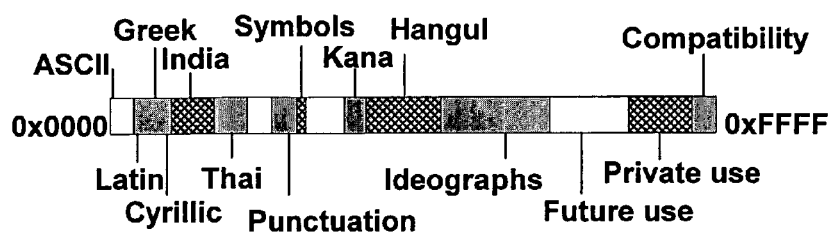
FIG. 2 illustrates the encoding layout for the Unicode standard.

The Unicode standard uses different ranges for each of its constituent scripts, as illustrated in FIG. 2. Given a character code point within the 16-bit address range of Unicode, it is straightforward using Unicode's encoding layout to identify the corresponding script by location. But because a single script can be used by more than one language, it is only by looking at the surrounding text and using statistical methods that the character set of the original language can be determined with any degree of certainty.

It should be noted that ASCII characters are used in nearly all scripts and therefore do not reveal significant information about the original language. Conversely, the presence of idiosyncratic characters which are strongly associated with particular languages can be used to infer the use of that language in the original text. For example, Hiragana characters in a stream of Han ideographs is a strong indication that the text is Japanese, and a stream of Hangul characters is almost certainly Korean. Other scripts have known associations with various particular languages.

In general, in terms of character set evaluation or identification the invention uses a character table bank against which the ability of a number of character sets to encode a given character is tested. When a message of unknown origin is presented to the system, its characters are parsed and tested against the character table bank to identify which of the pool of character sets can express each character.

Figure 1:
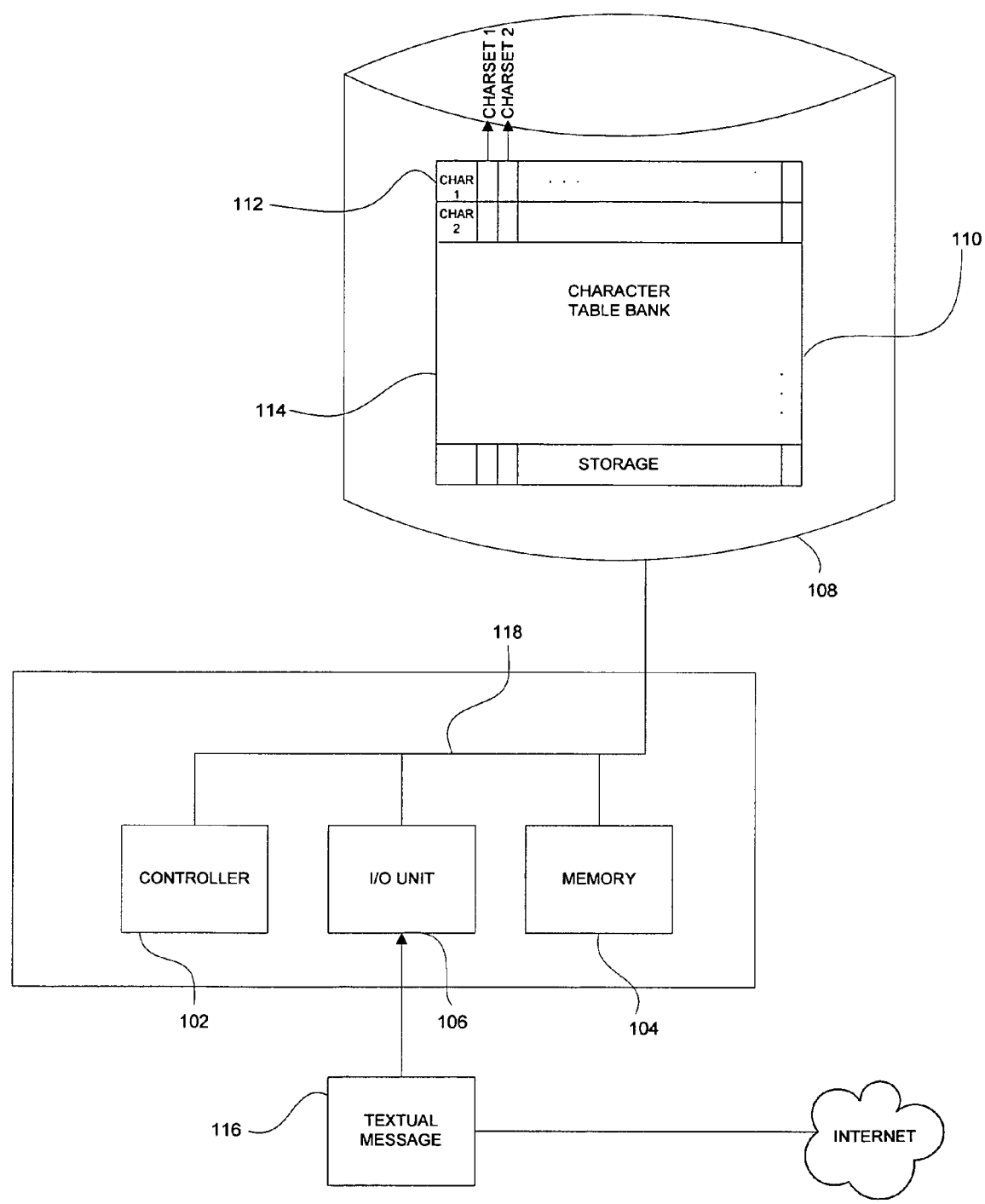
FIG. 1 illustrates an overall system for character set communication according to the invention.

A character set which contains a match for every character of the message is likely to be the native encoding of the original message. Tallies of matches to individual characters across all available character sets in the character table bank can also be made for the message as a whole. An overall architecture of a character set analysis system is illustrated in FIG. 1.

The invention in one regard uses statistical methods to provide an automatic and rigorous language evaluation facility by which the text represented in Unicode is tested against a bank of available language character sets, in order to determine which or any of those candidate character sets can express the text in its entirety. The invention evaluates which character sets are capable of expressing the text from the language bank, to present to a user or otherwise.

The invention may assign a rating to those character sets that can express the given message, in order to determine which of the character sets is the most appropriate to use to express the message. The invention may likewise evaluate which character set permits searching and reading of text expressions, improving the quality of search results, all as more fully described in the aforementioned copending U.S. application Ser. Nos. 09/384,088, 09/384,089, 09/384,371, 09/384,442, 09/384,443, 09/384,538, and 09/384,542.

Figure 3:
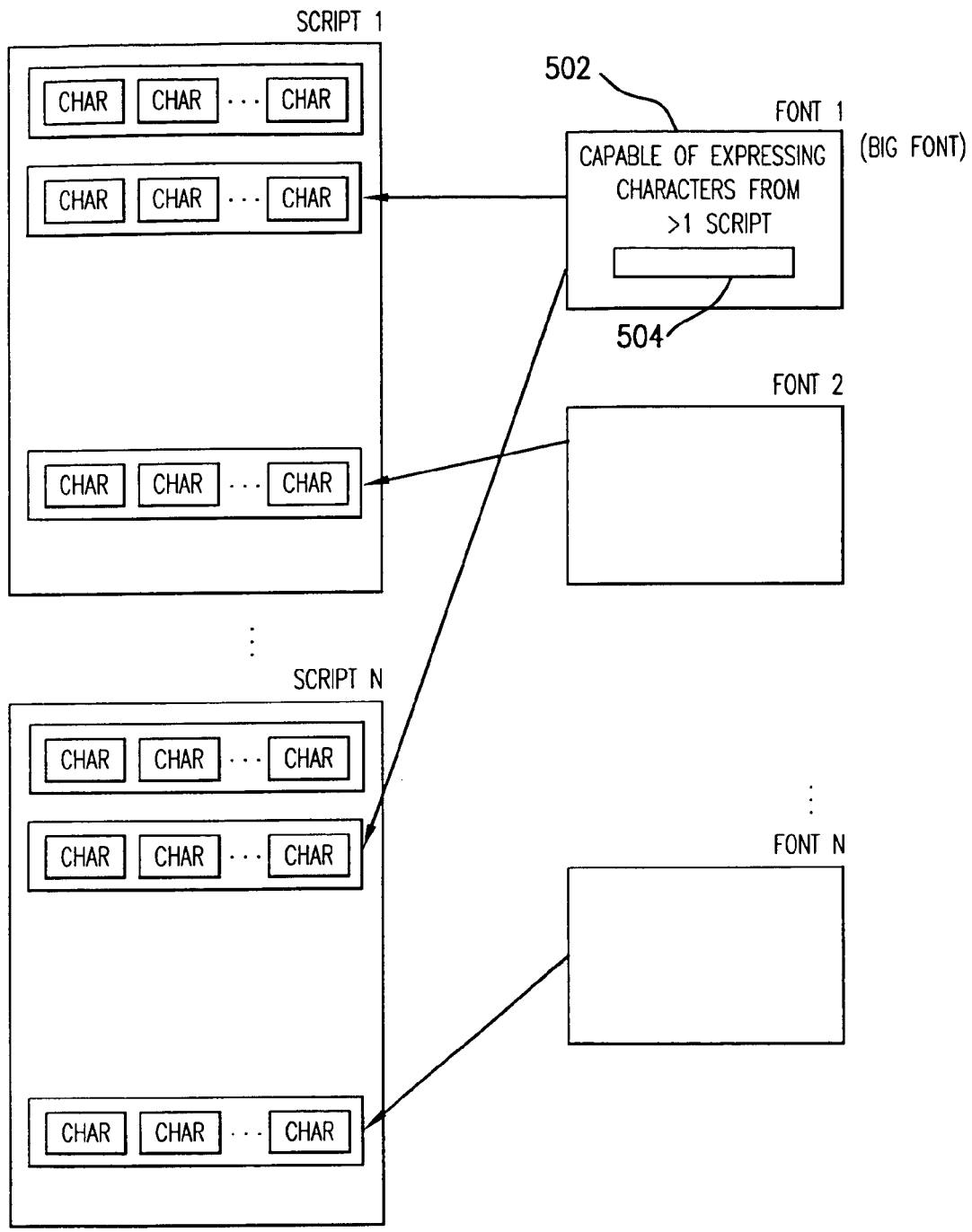
FIG. 3 illustrates the relationship between big fonts, characters, scripts and other entities according to the invention.
Figure 6:
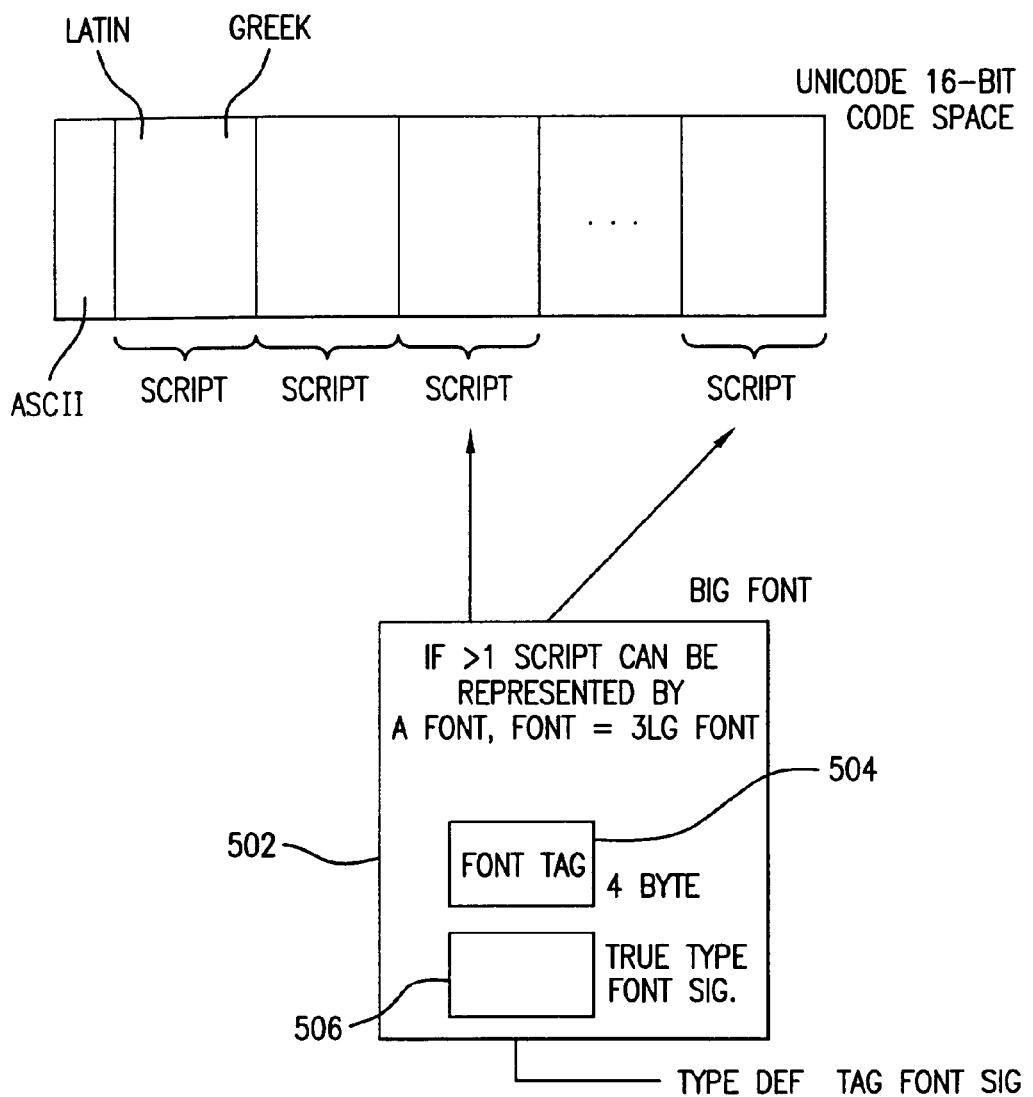
FIG. 6 illustrates the relationship between a big font object and Unicode encoding.

As illustrated in FIG. 3, fonts which are capable of representing characters from multiple scripts are referred to as big fonts 502. Within a big font 502, scripts are identified by font tag 504 that encodes information about the capabilities of that font, including an indication of scripts which employ the characters of that font. In one embodiment the font tag may comprise a unique 4-byte identifier, but other formats are contemplated by the invention. Furthermore, as illustrated in FIG. 6, in the particular environment of True Type™ fonts, big fonts 502 may be tagged with a font signature 506 that contains information about the Unicode subranges currently supported.

For example, Microsoft Windows™ uses the following structure to exchange font signature information.

TABLE 1

```
Typedef struct tagFONTSIGNATURE
{
    DWORD fsUsb[4];      //Unicode subranges
    DWORD fsCsb[2];      //Windows and OEM code pages
} FONTSIGNATURE;
```

Individual applications can query big fonts about their multilingual capabilities by accessing the font tag 504 according to the invention. More specifically, client software can inquire whether a given font may be able to render the text of a current document correctly. Microsoft™ Windows™ provides the following function to obtain the font signature of a font currently selected in a Device context, as will be understood by persons skilled in the art.

TABLE 2

```
int WINAPI GetTextCharsetInfo(HDC hdc,
    LPFONTSIGNATURE lpSig,
    DWORD
    dwFlags);
```

Figure 4:
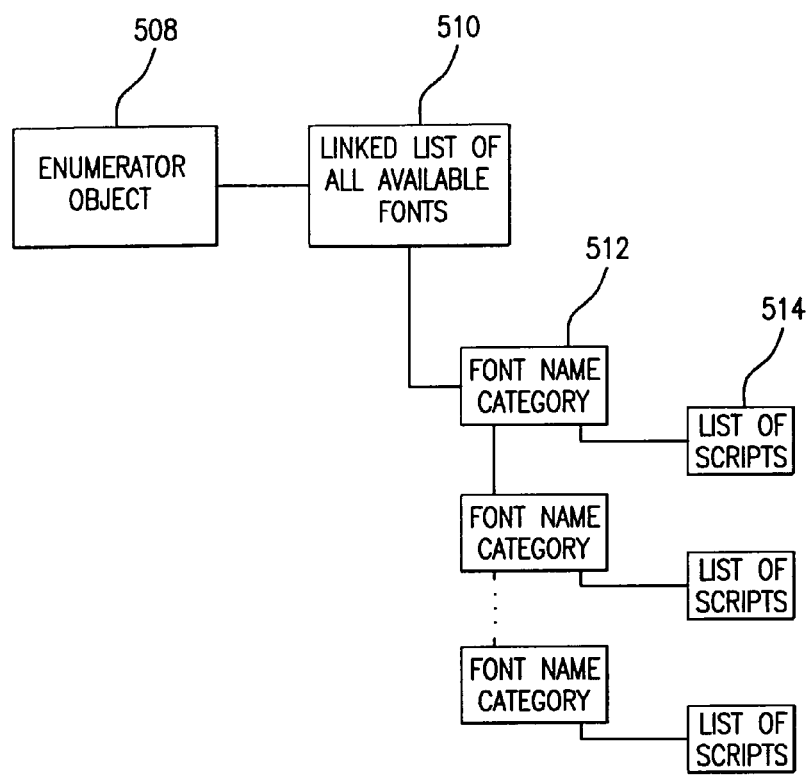
FIG. 4 illustrates the operation of an enumerator module according to the invention for generating a link list of fonts.
Figure 5:
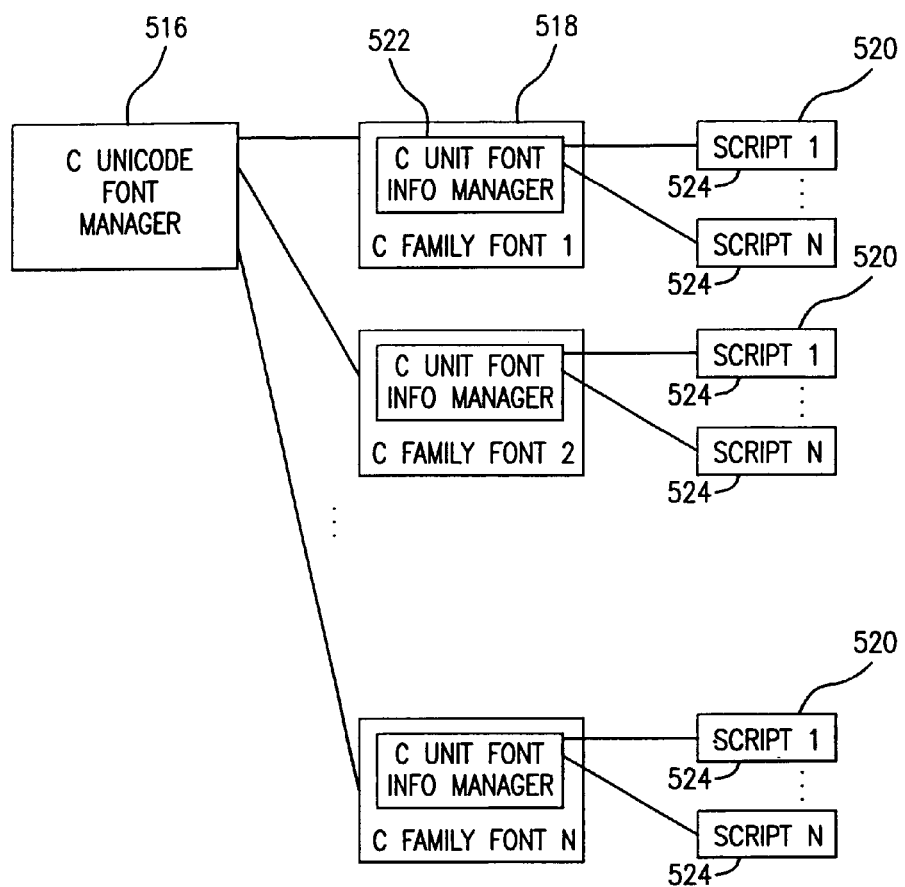
FIG. 5 illustrates the operation of a font manager module according to the invention.

The procedure call in Table 2 above can only be used, however, to validate a given font for matching a character set which is already specified. To dynamically select an appropriate font, the invention instead enumerates all the fonts available in the system and organizes them by name. In the practice of the invention, and as illustrated in FIGS. 4 and 5, this enumeration function is generally done at initialization time by creating a linked list of structures that contain various categories of information about the native fonts. Each font name category then contains a list of all the scripts supported, as well as the graphical font objects associated with that script. The ouputting of a subject text to a screen display, printer or otherwise can therefore be performed by traversing the linked list. FIGS. 4 and 5 adhere to the syntax of the C++ language, although it will be understood that other programming languages may be used.

As illustrated in FIG. 5, the CUnicodeFontManager module 516 contains a linked list of CFamilyFont modules 518, each of which contains a CUnitFontInfoManager module 522 that contains a linked list object 520 containing a sequence of CUnitFontInfo objects 524 identifying scripts associated with or capable of expressing a given symbol. Ouputting the subject text is then a matter or traversing the linked list to invoke the fonts associated with the CUnitFontInfo objects 524, to send to a display screen, printer or otherwise.

To build the linked list object 520, the following Windows™ function may be used.

TABLE 3

```
int EnumFontFamiliesEx(HDC,
    LPLOGFONT, //pointer to logical font
    FONTENUMPROC,//pointer to callback function
    LPARAM, //application-supplied data
    DWORD); //reserved; must be zero
```

In this environment, the callback function passed to the procedure call EnumFontFamiliesEx must have the following prototype.

TABLE 4

```
int CALLBACK EnumFontFamExProc(
    ENUMLOGFONTEXW *lpelfe,      // pointer to logical-font data
    NEWTEXTMETRICEXW *lpntme,    // pointer to physical-font data
    int FontType,                // type of font
    LPARAM lParam); // application-defined data
```

Inside the callback function in Table 4 above, the linked list object 520 can be built using the data passed by the system. In the particular environment of Microsoft™ Windows™, the character set used is actually a font character set which does not necessarily match the character set or code page that is returned by the integrated character set guessing algorithm of the invention. Therefore, in one embodiment it is necessary to map the code page to a font character set property, before doing a lookup query to the linked list object 520 of available fonts.

The code in Table 5 below is as an example under Microsoft™ Windows™ of such a code page mapping.

TABLE 5

```
BYTE MapCodePageToFontCharset(short iActiveCodePage)
{
    switch(iActiveCodePage)
    {
        case 874:
            Return THAI_CHARSET;
        case 932:
            Return SHIFTJIS_CHARSET;
        case 936:
            Return GB2312_CHARSET;
        case 949:
            Return HANGEUL_CHARSET;
        case 950:
            Return CHINESEBIG5_CHARSET;
        case 1250:
            Return EASTEUROPE_CHARSET;
        case 1251:
            Return RUSSIAN_CHARSET;
        case 1252:
            Return ANSI_CHARSET;
        case 1253:
            Return GREEK_CHARSET;
        case 1254:
            Return TURKISH_CHARSET;
        case 1255:
            Return HEBREW_CHARSET;
        case 1256:
            Return ARABIC_CHARSET;
        case 1257:
            Return BALTIC_CHARSET;
        default:
            break;
    }
    Return DEFAULT_CHARSET;
}
```

If a client application working in tandem with the invention to process text needs to create a graphical font object, that application will need to use a return flag when creating a logical font structure according to the invention. For further example in Windows™:

TABLE 6

```
BYTE FlagCharset=MapCodePageToFontCharset( iActiveCodePage);
LOGFONT lFont;
(Initialization of lFont . . .)
LFont.lfCharSet = FlagCharset;
CreateFontIndirect ( &lFont);
. . .
```

When the font has been created and selected into a Device context, it may then be necessary to query information such as ordering, ligature, existence of additional glyphs that are not encoded, and other information for output presentation. Windows™ provides the following function to access these properties:

DWORD WINAPI GetFontLanguageInfo(HDC);

Another Windows™ function which is useful in this regard is:

TABLE 7

```
DWORD WINAPI GetCharacterPlacement(
    HDC, // handle to device context
    LPCSTR, //pointer to string
    Int, // number of characters in string
    Int, //maximum extent for display
    LPGCP_RESULTS, //Result buffer
    DWORD); //placement flags
```

The procedure call GetCharacterPlacement can be used to query information from font tag 504 about a displayed string such as its width, ordering, glyph rendering and other information that may be used by client applications or otherwise to adjust the output document.

Another embodiment of the invention involving documents made up of sections in different languages will now be described. Using the character guessing algorithm described more fully in the aforementioned copending U.S. application Ser. Nos. 09/384,088, 09/384,089, 09/384,371, 09/384,442, 09/384,443, 09/384,538, and 09/384,542, the text-rendering subsystem first segments the text into multiple text runs that share the same character set or Unicode range. In general, the invention manages multipart, multilanguage documents by decomposing them into discrete segments for output.

Figure 7:
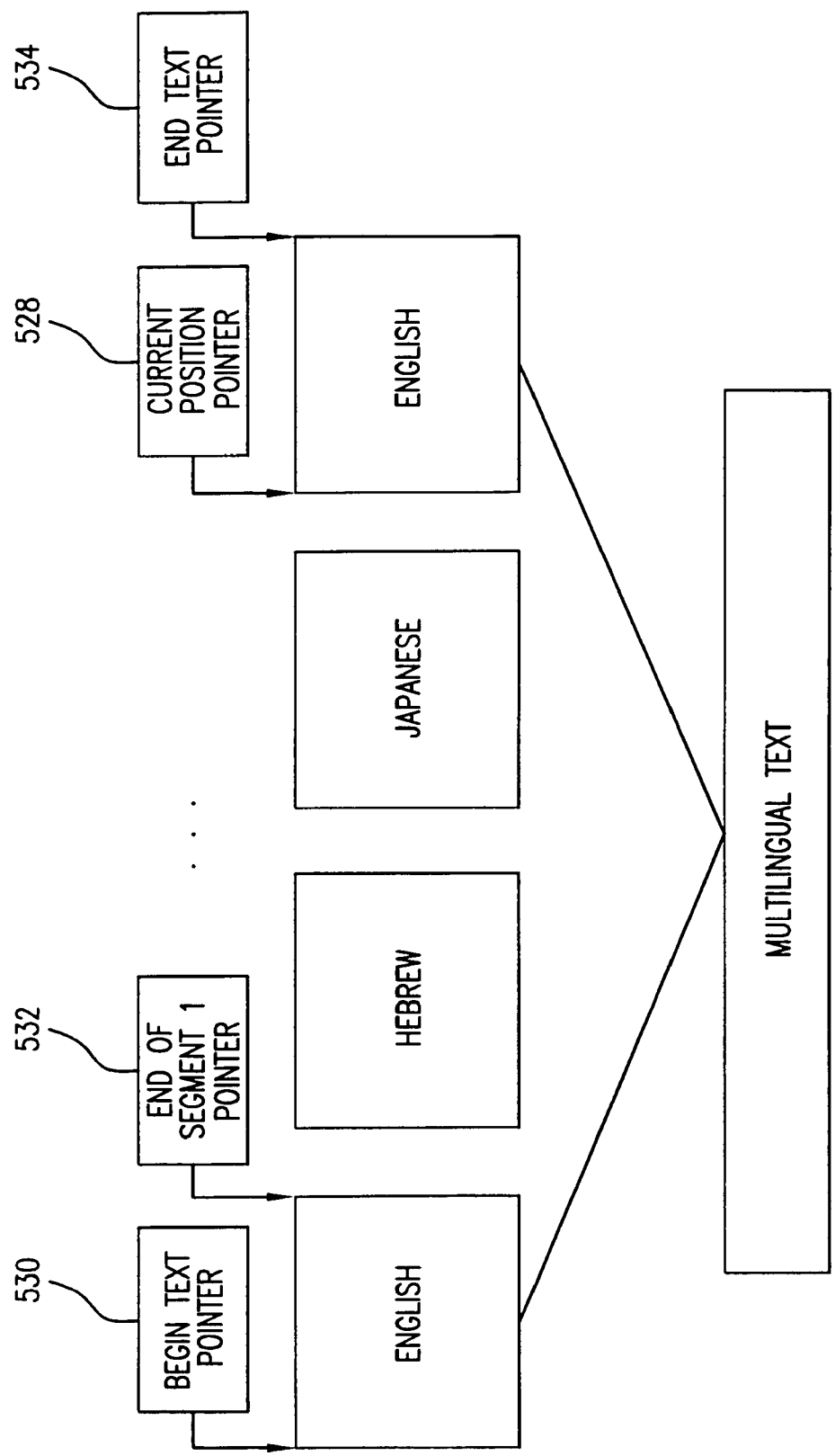
FIG. 7 illustrates a multipart document for output according to the invention.

FIG. 7 illustrates the decomposition of a multilingual text. For each segment, the invention looks up the preloaded list of system fonts to select the appropriate font. Once every segment is assigned a correct font, the entire text is displayed, as illustratively implemented in the code of the following Table 8.

TABLE 8

```
For (each segment)
{
    Load font into Device Context
    Display text in segment
    Unload font
}
```

An additional difficulty in a multi-part context is the increased complexity that is introduced in functions such as word wrapping, cursor movement, text highlighting and other graphically oriented operations. This is because multiple text segments must be juggled, and for each textual segment, properties such as selected font, text position (coordinate of the Xstart and Ystart for the string), caret position, and other information must be tracked.

Figure 8:
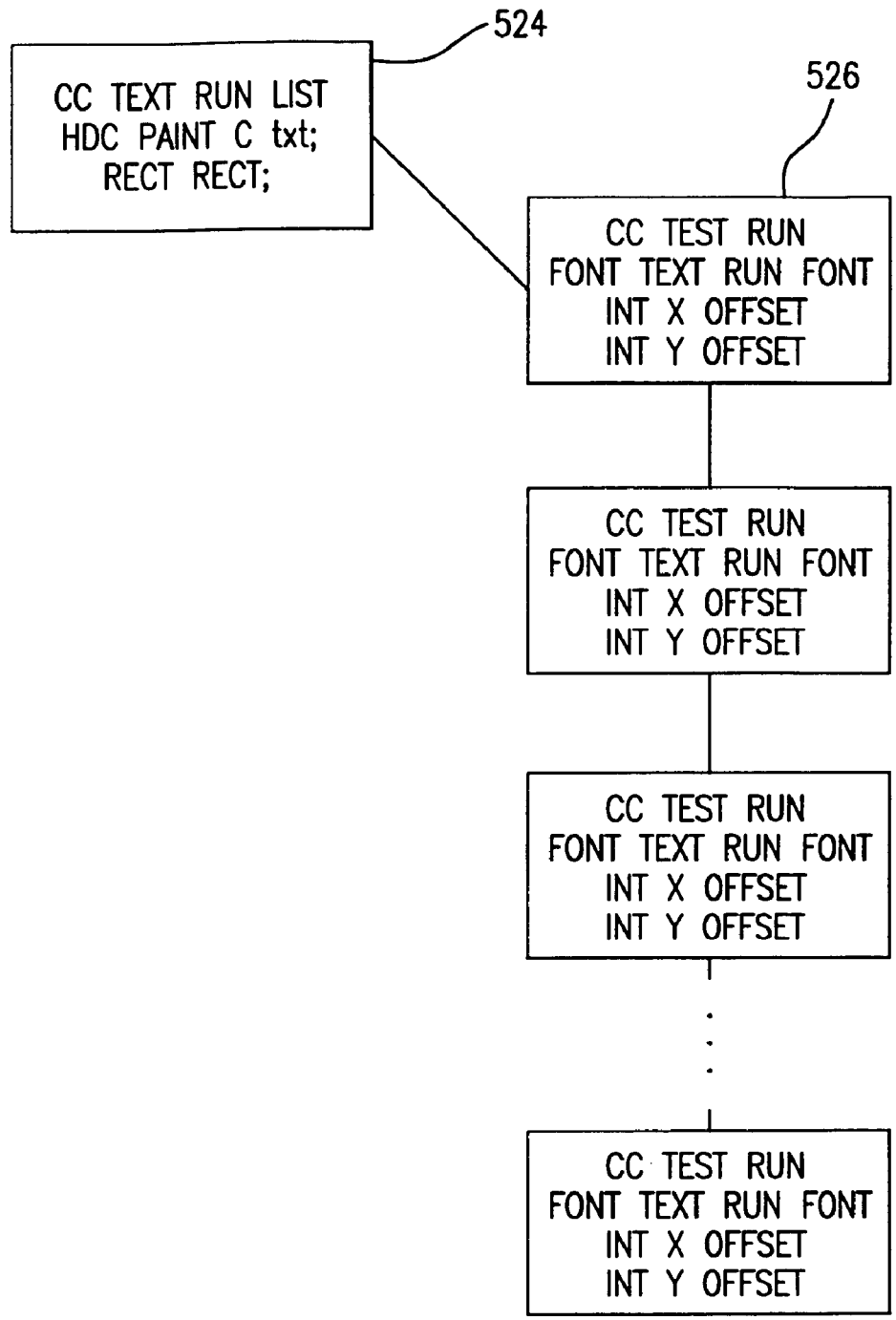
FIG. 8 illustrates a text run object for separating individual portions of a multiple language document for different font expression according to the invention.

The object CCTextRunList illustrated in FIG. 8 encapsulates a list of ccTextRun objects 524 to manage the operations of such features, including to generate a multipart linked list object 526. The following procedure call is intended to create this linked list object 526.

TABLE 9

```
While (Not end of text)
{
    EvaluateTextCharset( );
    Build text run with same charset . . .
    new TextRun in List( . . . );
}
```

The invention uses the technique described above to display the data in a multipart, multilanguage environment. In this case, the invention must likewise address complications to common word processing and other functions like text highlighting, text cursor placement, cursor movement, and so forth. The complexity for implementing these features is increased by the fact that the text is decomposed into multiple segments or runs. For example, to compute the extent of the text, in this embodiment the invention separately computes the extent of each segment and then adds them together.

TABLE 10

```
SIZE GetMutilingualTextExtent(HDC hdc)
{
    SIZE RetSize;
    For (each segment)
{
Load font into Device Context
Compute extent for segment
Add the size to RetSize;
Unload font
}
Return RetSize;
}
```

Because more than one font is involved in the display process, the size of the text displayed in each segment can vary considerably. Therefore, a once simple operation, such as highlighting the text, can become very involved in this embodiment. The invention therefore needs to compute the smallest rectangle that contains the whole text to assist in highlighting and other functions. To improve performance, this information is stored as part of the ccTextRunList objects 524, and updated during outputting to screen, printer or otherwise.

Managing the caret position and movement also requires special attention. Again this is because the text is separated into multiple segments, and the invention thus needs a function that gets the next character. In this embodiment, the invention stores a current position pointer 528 to the current text segment as illustrated in FIG. 7, as well as a set of other pointers including the illustrated begin text pointer 530, end of segment 1 pointer 532 (first segment illustrated but begin/end pointers for other segments being contemplated), and end of text pointer 534.

TABLE 11

```
Short GetNextCharacter( )
{
    If (end of segment)
        Select next segment
    If (no more segment)
        Return End of text
    Get next character in current segment
    Return next character;
}
```

Once the character is returned, it is straightforward to retrieve its width using the font identified for the segment. The invention in this embodiment may process as many segments are necessary to properly encode the text for output. Different scripts may appear one or more times in the aggregate document.

Figure 9:
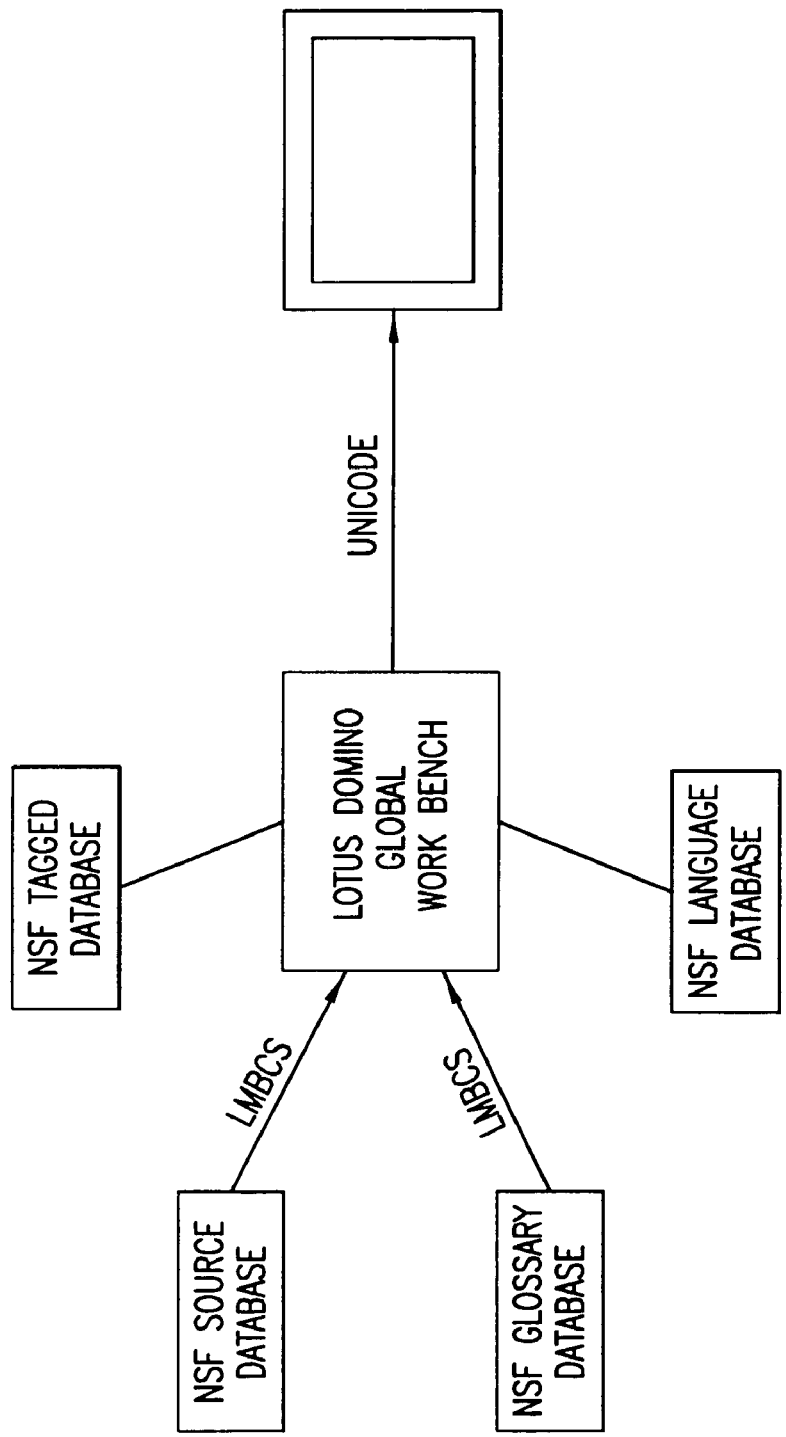
FIG. 9 illustrates an embodiment of the invention implemented in a Lotus Notes™/Domino™ environment.

Another environment of the invention relating to the Lotus Domino™ Global WorkBench™ illustrated in FIG. 9. Lotus Domino™ Global WorkBench™ is a tool used for the localization of Notes™ databases and Web sites. It must correctly render the data stored in Notes™ databases, which use a Lotus-proprietary universal character set (Lotus Multi-Byte Character Set, or LMBCS) that is converted to Unicode for output, no matter what the language version of the operating system used at run time. In a Notes™ environment as shown, once conversion to Unicode is carried out, output font processing may be performed as described above. Alternatively, the enumerator and other modules of the invention may be configured to directly operate on the Notes™-native character code.

The foregoing description of the system and method of the invention is illustrative, and variations in configuration and implementation will occur to persons skilled in the art. For example, while the output of characters has been described with respect to display on a computer monitor or printing, other types of output such as facsimile and others can be performed. The scope of the invention is accordingly intended to be limited only by the following claims.

What is claimed is:

1. A method of selecting a font to output a message represented by at least one unknown language, comprising the steps of:
   creating a linked list of structures including at least one category of information associated with available system fonts;
   parsing characters of the message and comparing each character of the message against all entries in a character table bank during an initial search, wherein the entries in the character table bank comprise a plurality of character sets and wherein the plurality of character sets includes all available character sets;
   identifying the character sets of the character table bank that support the characters of the message;
   traversing the linked list of structures to compare the at least one category of information associated with available system fonts against the identified character sets; and
   selecting at least one of the available system fonts to output the message based on the comparison results between the at least one category of information associated with available system fonts and the identified character sets.

2. The method of claim 1, wherein the step of creating the linked list of structures including at least one category of information associated with the available system fonts comprises creating font tag information.

3. The method of claim 1, wherein the message is output to a printer.

4. The method of claim 2, wherein the characters of the message are encoded in Unicode.

5. The method of claim 1, wherein the step of identifying the character sets of the character table bank that support the characters of the message further comprises associating at least a code page to the characters of the message.

6. A system for selecting a font to output a message represented by at least one unknown language, comprising:
   an enumeration module adapted to create a linked list of structures including at least one category of information that is associated with available system fonts;
   a character evaluation module that is adapted to parse characters of the message and compare each character of the message against all characters of a character table bank during an initial evaluation, wherein the entries in the character table bank comprise a plurality of character sets and wherein the plurality of character sets includes all available character sets;
   a character set identification module that is adapted to identify the character sets of the character table bank that support the characters of the message;
   an association module that is adapted to traverse the linked list of structures to compare the at least one category of information associated with available system fonts against the identified character sets;
   a selection module that is adapted to select at least one of the available system fonts to output the message based on the comparison results between the at least one category of information associated with available system fonts and the identified character sets; and
   an interface module that is adapted to output the characters of the message.

7. The system of claim 6, wherein the enumeration module is further adapted to create the linked list of structures comprising at least font tag information associated with the available system fonts.

8. The system of claim 6, wherein the interface module is a printer.

9. The system of claim 6, wherein the characters of the message are encoded in Unicode.

10. The system of claim 6, wherein the association module is further adapted to associate at least a code page to the characters of the message.

11. A system for selecting a font to output a message represented by at least one unknown language, comprising:
    enumerating means for creating a linked list of structures including at least one category of information that is associated with available system fonts;
    character evaluating means for parsing characters of the message and comparing each character of the message against all characters of a character table bank during an initial evaluation, wherein the entries in the character table bank comprise a plurality of character sets and wherein the plurality of character sets includes all available character sets;
    character set identifying means for identifying the character sets of the character table bank that support the characters of the message;
    association means for traversing the linked list of structures to compare the at least one category of information associated with available system fonts against the identified character sets;
    selecting means for selecting at least one of the available system fonts to output the message based on the comparison results between the at least one category of information associated with available system fonts and the identified character sets; and
    interfacing means for outputting the characters of the message.

12. The system of claim 11, wherein the enumerating means creates the linked list of structures comprising at least font tag information associated with the available system fonts.

13. The system of claim 11, wherein the interfacing means is a printer.

14. The system of claim 11, wherein characters of the message are encoded in Unicode.

15. The system of claim 11, wherein the associating means associates at least a code page to the characters of the message.

16. A storage medium for storing machine readable code, the machine readable code being executable to select a font to output a message represented by at least one unknown language, the machine readable code comprising instructions for:
- creating a linked list of structures including at least one category of information associated with available system fonts;
- parsing characters of the message and comparing each character of the message against all entries in a character table bank during an initial search, wherein the entries in the character table bank comprise a plurality of character sets and wherein the plurality of character sets includes all available character sets;
- identifying the character sets of the character table bank that support the characters of the message;
- traversing the linked list of structures to compare the at least one category of information associated with available system fonts against the identified character sets; and
- selecting at least one of the available system fonts to output the message based on the comparison results between the at least one category of information associated with available system fonts and the identified character sets.

17. The storage medium of claim 16, wherein the machine readable code is further executable to create the linked list of structures comprising at least font tag information associated with the available system fonts.

18. The storage medium of claim 16, wherein the machine readable code is further executable to output the message to a printer.

19. The storage medium of claim 16, wherein the machine readable code is further executable to encode the characters of the message in Unicode.

20. The storage medium of claim 16, wherein the machine readable code is further executable to associate at least a code page output to the characters of the message.

* * * * *